United States Patent [19]

Barthelemy

[11] Patent Number: 4,937,322
[45] Date of Patent: Jun. 26, 1990

[54] CRYSTALLIZED SEMIAROMATIC POLYAMIDES HAVING HIGH TG AND TM LESS THAN 290 DEGREE C. FROM HINDERED AROMATIC DIAMINE AND BRANCHED CHAIN ALIPHATIC DIAMINE

[75] Inventor: Pascal Barthelemy, Lyons, France

[73] Assignee: Rhone-Poulenc Chimie, Courbevoie, France

[21] Appl. No.: 366,472

[22] Filed: Jun. 15, 1989

[30] Foreign Application Priority Data

Jun. 15, 1988 [FR] France .................. 88 08261

[51] Int. Cl.$^5$ ............................. C08G 69/26
[52] U.S. Cl. ..................... 528/349; 525/432; 528/183; 528/220; 528/229; 528/337; 528/340; 528/347
[58] Field of Search ............... 528/349, 347, 340, 337, 528/220, 229, 183; 525/432

[56] References Cited

U.S. PATENT DOCUMENTS

| | | | |
|---|---|---|---|
| 3,382,216 | 5/1968 | Blaschke et al. | 260/78 |
| 3,941,755 | 5/1976 | Chapman et al. | 260/78 |
| 4,163,101 | 7/1979 | Schade et al. | 528/349 |
| 4,207,411 | 6/1980 | Shue | 528/349 |
| 4,382,138 | 5/1983 | Paschke et al. | 528/349 |
| 4,384,112 | 5/1983 | Paschke et al. | 528/349 |

OTHER PUBLICATIONS

Chemical Abstracts, vol. 71, Abstract No. 114079d (1969), p. 75.

*Primary Examiner*—Harold D. Anderson
*Attorney, Agent, or Firm*—Burns, Doane, Swecker & Mathis

[57] ABSTRACT

Crystallized semiaromatic copolyamides having glass transition temperatures, Tg, greater than 142° C., melting points, Tm, less than 290° C. and improved thermomechanical properties, well adopted for the production of a wide variety of useful shaped articles, contain specified amounts of terephthalic acid, 2-methylpentamethylenediamine and hindered aromatic diamine recurring structural units.

5 Claims, No Drawings

CRYSTALLIZED SEMIAROMATIC POLYAMIDES HAVING HIGH TG AND TM LESS THAN 290 DEGREE C. FROM HINDERED AROMATIC DIAMINE AND BRANCHED CHAIN ALIPHATIC DIAMINE

CROSS-REFERENCE TO COMPANION APPLICATION

My copending application Serial No. filed concurrently herewith and assigned to the assignee hereof.

BACKGROUND OF THE INVENTION

1. Field of the Invention:

The present invention relates to crystallized polyamides, and, more especially, to crystallized polyamides produced from terephthalic acid, 2-methylpentamethylenediamine and a hindered aromatic diamine.

2. Description of the Prior Art:

Polyamides produced from aliphatic diamines and from aliphatic or aromatic dicarboxylic acids have long been known to this art. Depending on their composition, these polyamides are crystallized materials (and thus are designated "semicrystalline" polymers) having high melting points (Tm) or completely amorphous polymers having relatively low glass transition temperatures (Tg).

Semicrystalline polyamides are advantageously used for the production of shaped articles which have good thermomechanical strength at elevated temperatures. The most common semicrystalline polyamide is polyamide 66 (polymer of hexamethylenediamine and adipic acid); having a Tm on the order of 265° C., this polyamide can be easily melt-processed but, because of a low Tg of approximately 50° C., its fields of application are limited to those involving exposure to temperatures which remain below 100° C. Other semicrystalline polyamides are known to the art which have a higher Tg and consequently a better retention of mechanical properties as a function of temperature. Typical polyamides of this type are, for example, those produced from terephthalic acid, isophthalic acid (20 to 40 mol % in the mixture of diacids) and hexamethylenediamine (see particularly U.S. Pat. Nos. 3,941,755 and 4,607,073), which have a Tg of from approximately 120° to 140° C. The thermal stability of such polyamides is apparent, but conversion of these copolyamides requires very high processing temperatures because of their high melting points, which range from approximately 320° to 340° C. The possibility of obtaining Tg values above 100° C., while at the same time having Tm values which preferably remain below 290° C., such that the polymer can be processed according to the usual techniques employed for converting polyamide 66, exists and is present in the polyamide produced from terephthalic acid and 2-methyl-1,5-pentamethylenediamine (JA-A-69/019,551) whose Tg is equal to 142° C., whereas the Tm is equal to 285° C.

Since the Tg is an important factor that will determine the thermal stability of the polymers, serious need continues to exist in this art for polyamides having a Tg above 142° C. and a Tm which remains below 290° C.

SUMMARY OF THE INVENTION

Accordingly, a major object of the present invention is the provision of a novel class of semi-crystalline copolyamides having a Tg above 142° C. and a Tm below 290° C.

Briefly, the present invention features novel semi-crystalline copolyamides produced from terephthalic acid or a derivative thereof, 2-methylpentamethylenediamine and a hindered aromatic diamine, said copolyamides comprising recurring structural units of the following formulae (I), (II), optionally (II'), and (III):

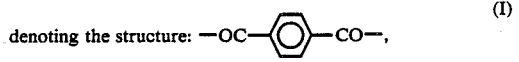

denoting the structure: $-OC-\bigcirc-CO-$,   (I)

denoting the structure:   (II)

$$-HN-CH_2-\underset{\underset{CH_3}{|}}{CH}-CH_2-CH_2-CH_2-NH-;$$

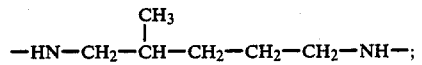

denoting the structure: $-HN-CH_2-\underset{\underset{C_2H_5}{|}}{CH}-CH_2-CH_2-NH-;$   (II')

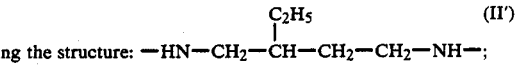

denoting the structure:   (III)

in which each of the symbols $R_1$, $R_2$, $R_3$ and $R_4$, which may be identical or different, is a methyl, ethyl, propyl or isopropyl radical, with the provisos that $R_1=R_2=R_3=R_4$, or $R_1=R_2$ and $R_3=R_4$, or $R_1=R_3$ and $R_2=R_4$, or $R_1=R_4$ and $R_2=R_3$, and the symbol A is one of the following groups

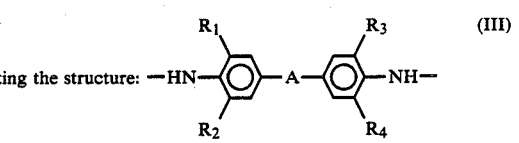

$$-CH_2-,\ -\underset{\underset{O}{\overset{\overset{O}{\|}}{S}}}{}-,$$

$-O-$ or

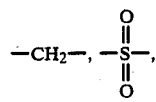

with the further provisos that (i) the molar ratio of the units (I) relative to the sum of the units (II)+(II')+(III) is equal to 1; (ii) the amount of units (II') in the mixture of (II)+(II') ranges from 0 to 5 mol % and that of the units (II), relative to the same mixture, ranges from 100 to 95 mol %; and (iii) the amount of units (III) in the mixture of (II)+(II')+(III) is less than 8 mol % when each of the four symbols $R_1$, $R_2$, $R_3$ and $R_4$ is a radical containing more than one carbon atom, or is less than 13 mol when two of the four symbols $R_1$, $R_2$, $R_3$ and $R_4$ are radicals containing more than one carbon atom (each of the other two symbols then being a methyl radical), or is less than 18 mol % when each of the four symbols $R_1$, $R_2$, $R_3$ and $R_4$ is a methyl radical.

DETAILED DESCRIPTION OF THE PREFERRED EMBODIMENTS OF THE INVENTION

More particularly according to the present invention, when the amount of units (III) becomes equal to or greater than any of the limits indicated above, the copolyamides produced are completely amorphous.

The recurring units of formula (I) are derived from terephthalic acid or from a derivative thereof, such as, for example, a dihalide or a diester.

The recurring units of formula (II) are derived from 2-methyl-1,5-pentamethylenediamine. As regards the optional recurring units of formula (II'), these are derived from 2-ethyl-1,4-tetramethylenediamine. The synthesis of the -methyl-pentamethylenediamine may be carried out by hydrogenation of the dinitrile of 2-methylglutaric acid according to known processes. Similarly, the synthesis of 2-ethyltetramethylenediamine may be carried out by hydrogenation of the dinitrile of 2-ethylsuccinic acid.

As regards the recurring units of formula (III), these are derived from diamines of the general formula:

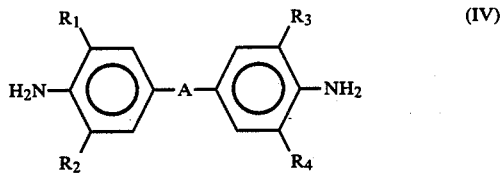

in which the symbols $R_1$, $R_2$, $R_3$, $R_4$ and A are as defined above in connection with the recurring units of formula (III).

In a preferred embodiment of the invention, the copolyamides have a structure as defined above, in which the units (III) are as defined above with $A = -CH_2-$; and the amount of units (III) in the mixture (II)+(II')+(III) ranges from 2 to 7 mol % when each of the four symbols $R_1$, $R_2$, $R_3$ and $R_4$ is a radical containing more than one carbon atom, or ranges from 2 to 12 mol % when two of the four symbols $R_1$, $R_2$, $R_3$ and $R_4$ are radicals containing more than one carbon atom, or ranges from 2 to 17 mol % when each of the four symbols $R_1$, $R_2$, $R_3$ and $R_4$ is a methyl radical.

Exemplary of the hindered diamines of formula (IV) which provide the recurring units of formula (III) in which $A = -CH_2-$, the following are particularly representative:
4,4'-diamino-3,3',5,5'-tetramethyldiphenylmethane;
4,4'-diamino-3,3',5,5'-tetraethyldiphenylmethane;
4,4'-diamino-3,5-dimethyl-3',5'-diethyldiphenylmethane;
4,4'-diamino-3,3'-diethyl-5,5'-dimethyldiphenylmethane;
4,4'-diamino-3,3',5,5'-tetraisopropyldiphenylmethane; and
4,4'-diamino-3,3'-diisopropyl-5,5'-dimethyldiphenylmethane.

These hindered diamines can be prepared according to the processes described in British Patent GB-A-852,651 and U.S. Pat. No. 3,481,900.

Exemplary of the copolyamides belonging to the preferred group described above, those which are very particularly suitable are the polymers which have a structure in which the recurring units of formula (III) are derived from the following hindered diamines: 4,4'-diamino-3,3'-diethyl-5,5'-dimethyldiphenylmethane; 4,4'-diamino-3,3',5,5'-tetraethyldiphenylmethane; and 4,4'-diamino-3,3',5,5'-tetraisopropyldiphenylmethane.

The copolyamides comprising recurring structural units of formulae (I), (II), optionally (II'), and (III) are easily prepared by polycondensation processes which are well known to this art.

For example, a convenient operating technique entails a melt polycondensation process. The diamines and the dicarboxylic acid are introduced into a stainless steel autoclave, water being added if appropriate. It is sometimes advantageous to prepare the salts of the diamines and of the dicarboxylic acid beforehand. The reactants are heated to a temperature ranging from approximately 200° to 250° C., while being stirred. The water vapor is removed and the temperature is increased to approximately 260° to 300° C. At this temperature the reaction mixture is stirred for a certain period of time in a nitrogen atmosphere. Finally, vacuum is applied to the autoclave and the condensation is continued up to such point in time when the polyamide has reached the desired molecular weight. A lower alkyl ester, such as for example a methyl ester, of the dicarboxylic acid can also be reacted with the mixture of diamines. This process may entail carrying out the following two steps in succession in the same single reactor: the first step is a prepolymerization at atmospheric pressure at a temperature on the order of 90° to 130° C. with removal of the alcohol formed; in the second step, the temperature is increased to about 250° to 300° C. with distillation of the alcohol to complete the polycondensation.

Another convenient such process is the technique of polycondensation in solution, according to which the halide of the dicarboxylic acid, such as, for example, the diacid chloride (terephthaloyl chloride), is reacted with the mixture of diamines, the operation being carried out in a solvent free from traces of water. The solvents which are commonly employed are good solvents or swelling agents for the polymers to be synthesized. They are generally polar and aprotic in nature. For greater efficiency of the polycondensation, an organic base capable of reacting with the hydracid released during the acylation reaction must also be dissolved in the reaction medium. This base is typically a tertiary amine such as, for example, triethylamine, diisopropylbutylamine or pyridine. During the polycondensation, the temperature of the reaction mixture is customarily maintained constant and relatively low, such as between 0° C. and 10° C. Once the addition of the reactants is completed, ambient temperature is restored. The polymer can then be isolated by precipitation in a nonsolvent.

Yet another convenient process for preparing the copolyamides according to the invention is by interfacial polycondensation. This takes place at the interface between an aqueous phase containing the amines and a water-immiscible organic solvent containing the halide of the dicarboxylic acid (for example: dichloromethane, tetrachloroethylene). An inorganic base is typically dissolved in the aqueous phase to trap the hydracid released during the acylation reaction. The reaction temperatures are generally maintained from 0° C. to 10° C., this being in order to limit the formation of oligomers of low molecular weight.

In any one of the aforementioned processes, the reactants are employed in such proportions that: (i) the molar ratio terephthalic acid or derivative thereof/diamine is equal to 1; (ii) the amount of 2-ethyl-1,4-tetramethylenediamine in the mixture of 2-ethyl-1,4-tetramethylenediamine+2-methyl-1,5-pentamethylenediamine ranges from 0 to 5 mol %; and the amount of hindered aromatic diamine of formula (IV) in the mixture of diamines is less than 8 mol %, and preferably ranges from 2 to 7 mol %, when each of the four symbols $R_1$, $R_2$, $R_3$ and $R_4$ is a radical containing more than one carbon atom, or is less than 13 mol %, and preferably ranges from 2 to 12 mol %, when two of the four symbols $R_1$, $R_2$, $R_3$ and $R_4$ are radicals containing more than one carbon atom (each of the other two symbols then being a methyl radical), or is less than 18 mol %, and preferably ranges from 2 to 17 mol %, when each of the four symbols $R_1$, $R_2$, $R_3$ and $R_4$ is a methyl radical.

When compared with the semicrystalline polyamides described in Japanese Application JA-A-69/019,551, the copolyamides according to the present invention are distinguished particularly by a higher glass transition temperature Tg which ranges from 143° to 160° C., depending on the structure and the amount of recurring units of formula (III), and by a melting point Tm which is lower than 285° C. Consequently, as a result of their improved Tg, the subject copolyamides have a better stability and a better retention of mechanical properties at elevated temperatures. Moreover, because of their Tm lowered to temperatures below 285° C., they can easily be converted according to the usual techniques employed in the case of polyamide 66.

The copolyamides according to the invention may be used as a molding powder and may be converted using conventional injection-molding, extrusion or spinning apparatus to provide shaped articles such as films, foils or filaments.

The additives usually employed during the preparation of polyamides may be added to the copolyamides of the invention before, during or near the final stages of the polycondensation. These additives are, for example, antioxidants, fireproofing agents, light stabilizers, heat stabilizers, impact modifiers, plasticizers, mold release agents, optical whiteners, colorants and the like. Reinforcing fillers such as organic or inorganic fibers, pigments, inorganic powders, and the like, may also be incorporated.

These additives may be mixed with the copolyamides, or else may be incorporated therein by a renewed melting in suitable apparatus, for example in an extruder.

The copolyamides in accordance with the present invention may also be blended or mixed with other homo- or copolyamides or mixtures thereof, or with other plastic materials. This is carried out, for example, by blending the constituent granules or plastic materials and then performing a coextrusion.

Exemplary polymers intended as such additional homopolyamide include, for example, nylon 12 (polymer of ω-aminododecanoic acid), nylon 11 (polymer of ω-aminoundecanoic acid), nylon 69 (polymer of hexamethylenediamine and of azelaic acid), nylon 610 (polymer of hexamethylenediamine and of sebasic acid), nylon 6 (polymer of ϵ-caprolactam) or nylon 66 (polymer of hexamethylenediamine and adipic acid). Exemplary such copolyamides include, for example, those comprising the monomers of the homopolyamides indicated above or other copolyamides.

In order to further illustrate the present invention and the advantages thereof, the following specific examples are given, it being understood that same are intended only as illustrative and in nowise limitative.

EXAMPLE 1

Copolyamide of the invention, produced from terephthaloyl chloride, 2-methyl-1,5-pentamethylenediamine and 4,4'-diamino-3,3',5,5'-tetraethyldiphenylmethane [the amount of recurring units (III) in the mixture of diamines was 5 mol %].

1. Synthesis of the copolyamide:

The following materials were introduced at ambient temperature (20° C.) under a dry nitrogen atmosphere into a 250-cm³ three-necked reactor made of Pyrex (registered trademark) glass, fitted with a central anchor stirrer and a dropping funnel:

(i) 5.51 g (0.0475 mole) of 2-methylpentamethylenediamine;

(ii) 10.11 g of triethylamine;

(iii) 0.775 g (0.0025 mole) of 4,4'-diamino-3,3',5,5'-tetraethyldiphenylmethane; and (iv) 43.60 g of N-methyl-2-pyrrolidone, dried beforehand for 5 hours over a 4 Å molecular sieve available commercially under the registered trademark Prolabo.

A solution of 10.15 g (0.0500 mole) of terephthaloyl chloride (recrystallized from cyclohexanone) in 43.60 g of N-methyl-2-pyrrolidone, dried beforehand as indicated above, was introduced under a dry nitrogen atmosphere into the dropping funnel.

The reactor was then cooled with iced water such as to adjust the temperature of the reaction mixture to a temperature on the order of 8° C. The contents of the dropping funnel were then introduced dropwise into the reactor over a period of 45 minutes, under a dry nitrogen atmosphere, under rapid stirring, the temperature of the reaction mixture being maintained at about 8° C. Upon completion of the addition of terephthaloyl chloride, a solution containing approximately 12% by weight of polymer was obtained. The reaction mixture was permitted to return to ambient temperature and was then stirred for 10 hours at this temperature.

The copolyamide obtained was precipitated by pouring the reaction mixture into 1.5 liters of water. The polymer was filtered off and was then washed 3 times in succession, each time with 1 liter of water, until the final aqueous wash no longer contained any chloride ions (detected using $AgNO_3$). The polymer was drained under vacuum and it was then dried in an oven at 80° C. under a vacuum corresponding to $1.33 \times 10^2$ Pa until a constant weight of 10.6 g was obtained. The yield of this synthesis was 93% (this yield is expressed by weight relative to the theoretical weight of the expected polymer).

2. Characterization of the copolyamide:

The copolyamide obtained was semicrystalline.

Its weight-average molecular weight ($\overline{Mw}$), determined by gel permeation chromatography with calibration using polystyrene, was 30,000.

The glass transition temperature Tg, determined by differential thermal analysis (DTA) with a rate of temperature increase of 10° C./min, carried out under nitrogen atmosphere, was 144° C. The melting point (Tm), determined by the same method, was found to be equal to 268° C.

The proton NMR analysis (solvent: $CF_3COOD$; internal standard: tetramethylsilane) confirmed the random polymer structure containing the following blocks:

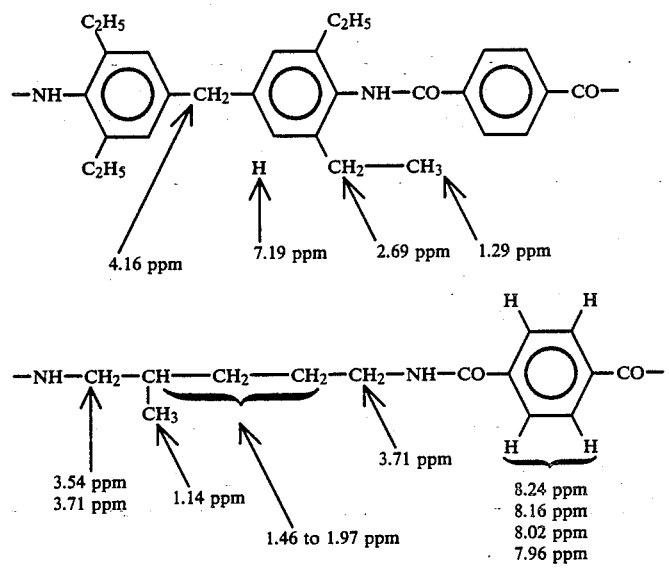

EXAMPLE 2 and COMPARATIVE TEST A

Copolyamides in which the recurring units (III) were derived from 4,4,-diamino-3,3,-diethyl-5,5,-dimethyldiphenylmethane, the amount of these units in the mixture of diamines being equal to 10 mol %.

The same operations as these described above in Example 1 were repeated, but this time using the following new charges and another solvent (1,3-dimethyl-2-imidazolidone instead of N-methyl-2-pyrrolidone), also dried over molecular sieve beforehand: in the glass reactor:

| Reactants/Solvent | |
|---|---|
| Methylpentamethylenediamine | 10.59 g |
| | (0.0913 mole) |
| Triethylamine | 20.94 g |
| Aromatic diamine hindered with methyl and ethyl groups | 2.88 g |
| | (0.0102 mole) |
| Dimethylimidazolidone | 29 g | in the dropping funnel:

| Reactants/Solvent | |
|---|---|
| Terephthaloyl chloride | 20.60 g |
| | (0.1015 mole) |
| Dimethylimidazolidone | 112.50 g |

The contents of the dropping funnel were introduced over 2 hours, 30 minutes. After precipitation of the polymer in 2 liters of water, its washing was carried out twice, each time with 2 liters of water.

By way of a comparative test, the behavior of a semicrystalline polyamide as described in Japanese Application JA-A-69/019,551 was examined. This polyamide was prepared from terephthalic acid and from 2-methyl-1,5-pentamethylenediamine in the following manner:

Into a 1-liter glass round-bottom flask were charged, under nitrogen:
(i) 124.57 g (0.7504 mole) of terephthalic acid;
(ii) 35.75 g of water; and
(iii) 299.75 g of ethanol.

The mixture was heated to 65° C. and it was then stirred for 30 minutes at this temperature. A solution containing the following materials was then introduced over 10 minutes into the contents of the round-bottom flask, under stirring:
(iv) 87.05 g of 2-methyl-1,5-pentamethylenediamine; and
(v) 136.60 g of water.

After 30 minutes of stirring, the reaction mixture was clear. It contained the salt of terephthalic acid and of methylpentamethylenediamine, which crystallized at an ambient temperature of 20 C. The salt was then filtered off and was then washed 3 times in succession, each time with 150 g of methanol and was finally dried in an oven at 45° C. under a vacuum corresponding to $66.5 \times 10^2$ Pa until a constant weight was obtained.

The prepolymerization of the salt obtained was then carried out in a Carius tube capable of withstanding an autogenous pressure of $18 \times 10^5$ Pa. For this purpose, 15 g of salt, 85 g of water and 0.0075 g of hypophosphorous acid were introduced into the Carius tube. The tube was sealed and was then placed in an oven heated to 210° C. for 2 hours.

At the end of this time, the tube was opened and the reaction mixture was poured into a 125-cm³ glass reactor capable of being evacuated. This reactor was placed in an oven whose temperature increase was according to the following cycle in order to complete the polycondensation:
Increase to 290° C. over 184 minutes,
Plateau at 290° C. under nitrogen for 60 minutes,
Plateau at 290° C. under a vacuum corresponding to $66.5 \times 10^2$ Pa for 104 minutes.

The table which follows reports the principal results of this example and test.

| Example/test | Yield of the synthesis | Nature of the copolyamide | Tg | Tm |
|---|---|---|---|---|
| 2 | 90% | semicrystalline | 156° C. | 260° C. |
| A | not determined | semicrystalline | 142° C. | 285° C. |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A crystallized semiaromatic copolyamide having a glass transition temperature, Tg, greater than 142° C., and a melting point, Tm, or less than 290° C., comprising recurring structural units, of the following formulae (I), (II), optionally (II'), and (III):

(I)

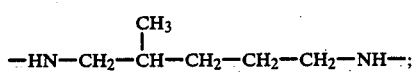
(II)

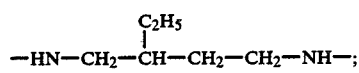
(II')

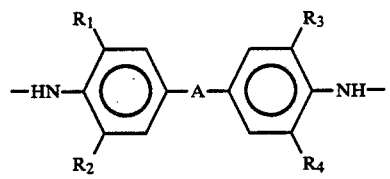
(III)

in which each of $R_1$, $R_2$, $R_3$ and $R_4$, which are identical or different, is a methyl, ethyl, propyl or isopropyl radical, with the provisos that $R_1=R_2=R_3=R_4$, or $R_1=R_2$ and $R_3=R_4$, or $R_1=R_3$ and $R_2=R_4$, or $R_1=R_4$ and $R_2=R_3$, and A is —$CH_2$—, —$SO_2$—, —O— or —CO—, and with the further provisos that (i) the molar ratio of the units (I) relative to the sum of the units (II)+(II')+(III) is essentially equal to 1; (ii) the amount of units (II') in the mixture (II)+(II') ranges from 0 to 5 mol % and that of the units (II), relative to the same mixture, ranges from 100 to 95 mol %; and (iii) the amount of units (III) in the mixture (II)+(II')+(III) is less than 8 mol % when each of $R_1$, $R_2$, $R_3$ and $R_4$ contains more than one carbon atom, or is less than 13 mol % when two of $R_1$, $R_2$, $R_3$ and $R_4$ contain more than one carbon atom and the other two are methyl radicals, or is less than 18 mol % when each of $R_1$, $R_2$, $R_3$ and $R_4$ is a methyl radical.

2. The crystallized semiaromatic copolyamide as defined by claim 1, wherein the recurring units (III) A is —$CH_2$—, and (iii) the amount of units (III) in the mixture (II)+(II')+(III) ranges from 2 to 7 mole % when each of $R_1$, $R_2$, $R_3$ and $R_4$ contains more than one carbon atom, or ranges from 2 to 12 mol % when two of $R_1$, $R_2$, $R_3$ and $R_4$ contain more than one carbon atom, or ranges from 2 to 17 mol % when each of $R_1$, $R_2$, $R_3$ and $R_4$ is a methyl radical.

3. The crystallized semiaromatic copolyamide as defined by claim 1, said recurring structural units (III) being derived from 4,4'-diamino-3,3'-diethyl-5,5'-dimethyldiphenylmethane, 4,4'-diamino-3,3',5,5'-tetraethyldiphenylmethane, or 4,4'-diamino-3,3',5,5'-tetraisopropyldiphenylmethane.

4. A composition of matter comprising admixture of a crystallized semiaromatic copolyamide as defined by claim 1, with a nylon 12, 11, 69, 610, 66 or 6 homo- or copolyamide.

5. A shaped article comprising a crystallized semiaromatic copolyamide as defined by claim 1.